United States Patent [19]
Kato et al.

[11] Patent Number: 5,662,486
[45] Date of Patent: Sep. 2, 1997

[54] ROTARY CONNECTOR

[75] Inventors: Hironori Kato; Masanori Nakao, both of Miyagi-ken, Japan

[73] Assignee: Alps Electric Co. Ltd., Tokyo, Japan

[21] Appl. No.: 552,411

[22] Filed: Nov. 3, 1995

[30] Foreign Application Priority Data

Nov. 4, 1994 [JP] Japan .................................. 6-271155

[51] Int. Cl.⁶ .............................................. H01R 35/00
[52] U.S. Cl. .................................... 439/164; 439/15
[58] Field of Search ............................... 439/15, 164

[56] References Cited

U.S. PATENT DOCUMENTS

| | | |
|---|---|---|
| 4,722,690 | 2/1988 | Priede ........................................ 439/15 |
| 5,248,260 | 9/1993 | Ida et al. ................................... 439/15 |
| 5,334,023 | 8/1994 | Schaner et al. ........................ 439/164 |

Primary Examiner—Gary F. Paumen
Assistant Examiner—T. C. Patel
Attorney, Agent, or Firm—Guy W. Shoup; Patrict T. Bever

[57] ABSTRACT

A rotary connector wherein a free rotation between both housings can be locked or unlocked in a simple manner. A holding member is formed integrally with a first housing through a thin-walled portion, while engaging projections are formed integrally with a second housing, and at the rotary connector manufacturing stage, by aligning both housings exactly with each other and thereafter inserting a tapping screw threadedly into a support portion of the holding member, the tapping screw can be brought into abutment with both engaging projections. Further, at the time of mounting the rotary connector into a steering system, a free rotation between both housings is ensured by cutting the holding member at the thin-walled portion.

9 Claims, 2 Drawing Sheets

ROTARY CONNECTOR

BACKGROUND OF THE INVENTION

1. Field of the Invention

The present invention relates to a rotary connector having a pair of housings which constitute a fixed member and a movable member, respectively, and which are interconnected electrically through a flexible cable such as a flat cable or the like. Particularly, the invention is concerned with a lock mechanism for locking or unlocking a free rotation of the movable member.

2. Description of the Prior Art

A rotary connector of this type is incorporated in an automobile steering system and is used as a conducting means for, for example, an air bag circuit which connects between the steering wheel and the body of the automobile. In this case, it is necessary to mount the rotary connector in such a manner that the movable member can rotate in both directions to about the same degree from a neutral position of the steering wheel. To meet this requirement, the rotary connector is provided with an alignment mechanism for aligning the fixed member and the movable member to a neutral position of rotation and a lock mechanism for maintaining such neutral state until the rotary connector is mounted into the steering system.

The former alignment mechanism is constituted by providing one of the fixed member and the movable member with a rotating member having a gear and providing the other with an engaging member for engagement with the gear of the rotating member. At every rotation of the movable member, the gear comes into engagement with the engaging member and rotate by a predetermined angle, so that the neutral position is attained when the a specific tooth of the gear is in a predetermined position and when the movable member is in a predetermined position relative to the fixed member. In view of this point, a mark is provided on the specific tooth of the gear and also on a member which supports the gear, and by alignment of these marks at the time of mounting the rotary connector to the steering system, the rotary connector can be mounted in the neutral position of the movable member relative to the fixed member.

As the latter lock mechanism referred to above there have been proposed various types, but generally known is the type using a lock member which can be mounted and removed with respect to the rotary connector. According to the construction of this known type, the lock member is fixed to either the movable member or the fixed member with a set-screw and is retained to the other. Since the free rotation of the movable member is prevented by the lock member, it is possible to maintain the neutral state of the movable member and the fixed member which have been aligned by the foregoing alignment mechanism. Then, by loosening the set-screw and removing the lock member from the rotary connector at the time of mounting the rotary connector to the steering system, the locked state between the movable member and the fixed member is released, so that the movable member becomes rotatable freely.

In the case of the above conventional lock mechanism, it is necessary to loosen the set-screw and remove the lock member from the rotary connector at the time the locked state is released. Consequently, the set-screw and the lock member are apt to become separated from each other and hence it is required to pay close attention to the handling of those two parts. Particularly, since the set-screw is rotated with a jig such as a screwdriver or the like, it is apt to fall off in the course of removal of the lock member from the rotary connector. Once the set-screw falls off, it may stay within the steering system and generate a noise during running of the automobile or may cause short-circuit of peripheral circuits because the set-screw is electrically conductive. Further, at the production stage of the rotary connector and after alignment of the movable member and the fixed member to the neutral state by using the foregoing alignment mechanism, it is necessary to insert the set-screw into a hole of the lock member and tighten it into a threaded hole formed in the movable member or the fixed member. However, since the threaded hole is covered with the lock member, the hole-threaded hole aligning work is troublesome, and thus also in this point there has been a difficulty in the assembling work.

As disclosed in U.S. Pat. No. 5,248,260, there has been proposed a lock member integral with a plurality of stopper pieces for preventing the falling-off of the set-screw. However, since the stopper pieces are each of an undercut shape, there arise other problems such that the cost of a mold for molding the lock member rises to a great extent and that the stopper pieces are each an obstacle to the engagement of a jig with the set-screw.

SUMMARY OF THE INVENTION

The present invention has been accomplished in view of the above-mentioned circumstances of the prior art and it is the object of the invention to provide a rotary connector capable of locking or unlocking a free rotation between both housings in a simple manner.

According to the most principal feature of the present invention for achieving the above-mentioned object, the rotary connector of the invention is provided with first and second housings which are interconnected rotatably, a flexible cable accommodated and wound between the first and second housings, a holding member integral with the first housing through an allowance for cutting, a rotation restricting member fixed to the holding member, and an engaging projection integral with the second housing, wherein a free rotation between the first and second housings is prevented by abutment of a front end of the rotation restricting member with the engaging projection, and the first and second housings are unlocked from each other upon removal of the holding member from the first housing at the allowance for cutting.

At the manufacturing stage of the rotary connector the first and second housings are positioned so as to each assume a predetermined origin position and thereafter the rotation restricting member is fixed to the holding member integral with the first housing, whereby the front end of the rotation restricting member is brought into abutment with the engaging projection and hence the free rotation between both housings is prevented. In this case, it is merely required that the rotation restricting member is inserted in a predetermined position of the holding member threadedly or under pressure, without the need of performing the troublesome alignment work. Thus, the free rotation between both housings can be locked in a simple manner. Particularly, in the case of using a tapping screw as the rotation restricting member, the screw is difficult to become loose against vibrations, so it is possible to positively prevent accidental dislodgment of the tapping screw during conveyance of the rotary connector.

On the other hand, in the case of mounting the rotary connector into a steering system, once the holding member is removed from the rotary connector by cutting at the allowance for cutting, the rotation restricting member is also removed from the rotary connector together with the holder member, so that the locked state by the rotation restricting member is released and both housings become rotatable relative to each other.

DETAILED DESCRIPTION OF THE PREFERRED EMBODIMENT

An embodiment of the present invention will be described hereinunder with reference to the accompanying drawings.

Figure 1:
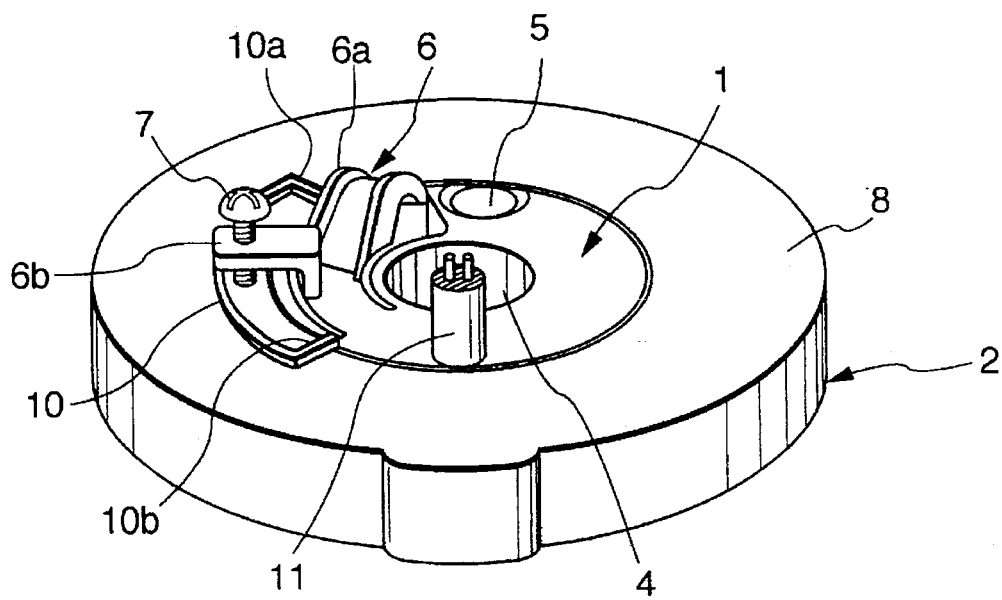
FIG. 1 is a perspective view of a rotary connector according to an embodiment of the present invention.
Figure 2:
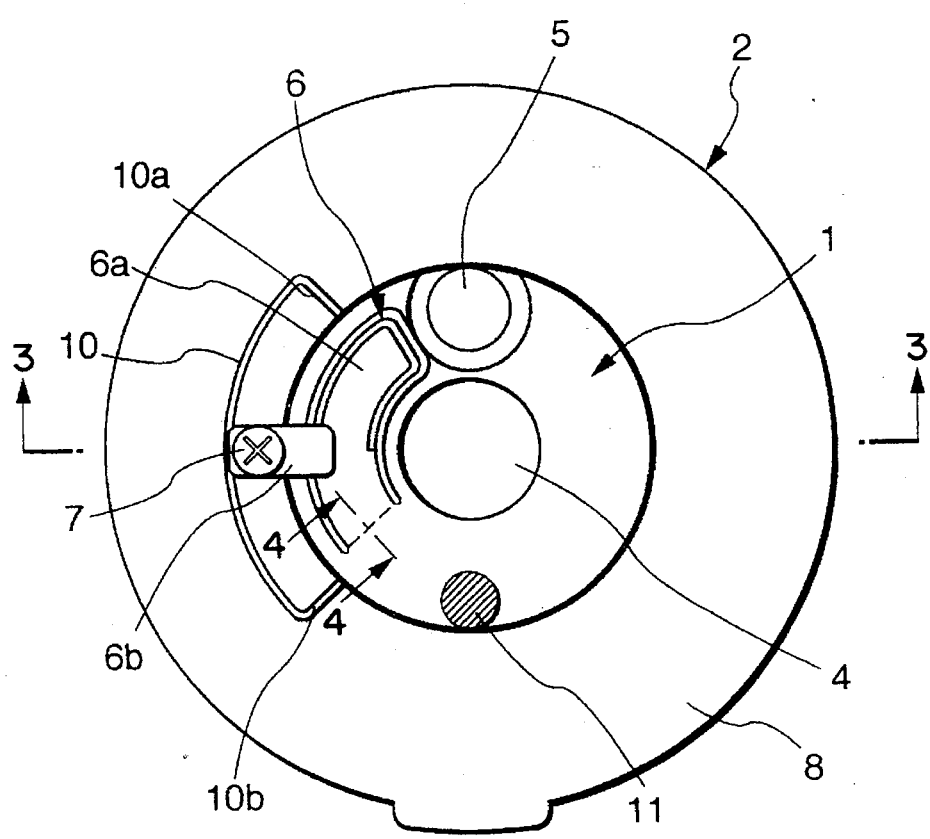
FIG. 2 is a plan view of the rotary connector.
Figure 3:
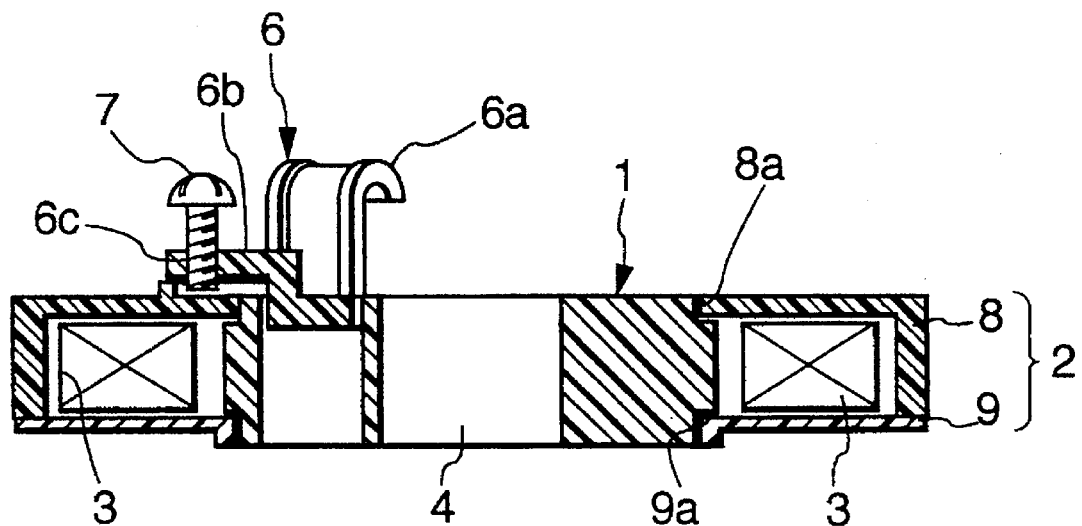
FIG. 3 is a sectional view taken along line 3—3 of FIG. 2.
Figure 4:
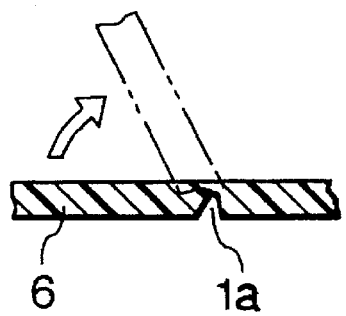
FIG. 4 is a sectional view taken along line 4—4 of FIG. 2.

FIG. 1 is a perspective view of a rotary connector embodying the invention, FIG. 2 is a plan view of the rotary connector, FIG. 3 is a sectional view taken along line 3—3 of FIG. 1, and FIG. 4 is a sectional view taken along line 4—4 of FIG. 2. As shown in these figures, the rotary connector substantially comprises a first housing 1, a second housing 2, which are interconnected rotatably, and a flexible cable 3 accommodated and wound inside both housings 1 and 2. In this embodiment, the first housing 1 is used as a fixed member and the second housing 2 as a movable member.

The first housing 1, which is formed of a synthetic resin material, has a cylindrical shape, with a shaft hole 4 being centrally formed therein for insertion therethrough of a steering shaft (not shown). Near the shaft hole 4 is formed a positioning hole 5 for insertion therein of a connecting pin (not shown) which is adapted to rotate integrally with the steering shaft. Further, integral with the top surface of the first housing 1 is a holding member 6 which constitutes part of a lock mechanism. As shown in FIG. 4, the holding member 6 is connected to the top surface of the first housing 1 through a thin-walled portion 1a, while the other portion is separated from the first housing 1 through a slit. Further, a finger-rest portion 6a is projectingly formed on the free end side of the holding member 6, and an L-shaped support portion 6b is formed between the finger-rest portion 6a and the thin-walled portion 1a. The support portion 6b extends horizontally outwards from the top surface of the housing 1, and in this extending portion is formed a hole 6c, into which is threadedly fixed a tapping screw 7 which serves as a rotation restriction member.

On the other hand, the second housing 2 is composed of an upper case 8 and a lower case 9 which are formed of a synthetic resin material. Both cases 8 and 9 are rendered integral with each other by a suitable fixing means such as, for example, hot caulking or bolting. On the inner peripheral edge side of the top surface of the upper case 8 is integrally formed an upwardly projecting jetty 10. A pair of walls positioned in the circumferential direction of the jetty 10 constitute engaging projections 10a and 10b. Both cases 8 and 9 are centrally formed with guide holes 8a and 9a, respectively, and the first housing 1 is rotatable along the guide holes 8a and 9a.

The flexible cable 3 is accommodated within a space formed between both housings 1 and 2, the space being in the shape of a ring when seen in plan view, and it is wound in a vertical shape or in a shape having an inverted portion located halfway along its length. For example, the flexible cable 3 is constituted by what is called a flat cable comprising plural conductors buried between a pair of base films, and one end thereof is fixed to the first housing 1 and thereafter drawn out to the exterior through wire 11, while the opposite end thereof is fixed to the second housing 2 and then drawn out to the exterior through wire (not shown). A known alignment mechanism comprising a gear and an engaging member is disposed between both housings 1 and 2, though not shown, whereby both housings can be aligned into an appropriate neutral state.

The rotary connector is generally constructed as above. The first housing 1 is fixed to the steering wheel (rotor member) side of a steering system and the second housing 2 fixed to the bearing (stator member) side of the steering shaft, and the rotary connector is used as electrical connection means for an air bag system, etc. In mounting the rotary connector into the steering system, it is required that the first housing 1 is rotated an equal distance in each of forward and reverse directions from the neutral position. To satisfy this requirement, at the rotary connector manufacturing stage, the first and second housings 2, 1 are assembled with the flexible cable 3 mounted therebetween, and after completion of the assembling work, both housings are aligned into an appropriate state. In this case, the tapping screw 7 is not threaded into the support portion 6b of the holding member 6, and the engaging projections 10a and 10b of the second housing 2 are not in abutment with any portion of the holding member 6, so that the first housing 1 can rotate freely within the length range of the flexible cable 3 relative to the second housing 2.

After the first housing 1 has been aligned to the neutral position in the above manner, the tapping screw 7 is inserted threadedly into the hole formed in the support portion 6b of the holding member 6 until just before abutment of its front end with the top surface of the second housing 2. As a result, the front end of the tapping screw 7 is positioned within the jetty 10 and goes into an abuttable state with both engaging projections 10a and 10b; therefore, the rotational range of the first housing 1 is restricted to a predetermined angular range for abutment of the tapping screw 7 with both engaging projections 10a and 10b. Thus, for example during conveyance of the rotary connector, the rotation of the first housing 1 is restricted within the above angular range and there is no fear of any accidental rotation of the first housing relative to the second housing. This state can be maintained up to just before mounting into the steering system.

In mounting the rotary connector to the steering system, first the shaft hole 4 of the first housing 1 is fitted on the steering shaft and the positioning hole 5 fitted on the connecting pin. By so doing, it becomes possible for the rotating force of the steering shaft to be transferred from the connecting pin to the first housing 1 through the positioning hole 5. In this connection, since the first housing 1 can rotate by a predetermined angle, as mentioned above, by rotating the housing 1 within that angular range, the positioning hole 5 can be easily fitted on the connecting pin.

Then, the second housing 2 is fixed to a predetermined stator member, e.g. steering column, by a suitable means such as bolting for example, and thereafter the worker is required to put his finger on the finger-rest portion 6a of the holding member 6 and bend the holding member in the direction indicated by the dash-double dot line in FIG. 4, whereby the holding member 6 is removed from the first housing 1. At this time, since a thin-walled portion 1a is present between the base portion of the holding member 6 and the top surface of the first housing 1, the holding member can be broken easily with the thin-walled portion 1a as an allowance for cutting. Further, since the tapping screw 7 is threadedly fitted into only the support portion 6b of the holding member 6 and not into the second housing 2, it is removed from the first housing 1 together with the holding member 6. As a result, the rotational restriction of the first housing by the tapping screw 7 and both engaging portions 10a, 10b is released, thus permitting the first housing 1 to rotate freely with respect to the second housing 2.

By lastly connecting the steering wheel to the steering shaft, the mounting of the rotary connector to the steering system is completed, and the rotary connector is now ready for use. In operation, as the steering wheel is turned clockwise or counterclockwise, the rotational force is transmitted from both steering shaft and connecting pin to the first housing 1 through the positioning hole 5, so that the first housing 1 rotates in the same direction. For example, when the steering wheel is turned clockwise from its neutral position of rotation, the first housing 1 also turns clockwise in interlock therewith and the flexible cable 3 is wound round the outer peripheral surface of the first housing 1. Conversely, when the steering wheel is turned counterclockwise, the first housing 1 also turns counterclockwise in interlock therewith and the flexible cable 3 is wound back along the inner peripheral surface of the upper case 8 of the second housing 2. In both cases the electrical connection between both housings 1 and 2 is maintained through the flexible cable 3.

According to the embodiment of the present invention described above, in the rotary connector manufacturing stage, both housings 1 and 2 are aligned properly and thereafter the tapping screw 7 is threaded into the support portion 6b of the holding member 6 formed integrally with the housing 2, with the result that the tapping screw 7 comes into abutment with both engaging projections 10a and 10b which are integral with the second housing 2. Thus, the free rotation between both housings 1 and 2 can be locked in a simple manner. More particularly, since the tapping screw 7 does not fix the holding member 6 but functions as a stopper for abutment with both engaging projections 10a and 10b, it suffices for the tapping screw to be merely threaded into the hole 6c of the holding member 6, that is, the troublesome operation of aligning the hole 6c with the threaded hole can be omitted. Besides, since the holding member 6 is integral with the first housing 1 through the thin-walled portion 1a, it is possible to decrease the number of components used. Further, since the tapping screw 7 is difficult to become loose against vibrations, it is not likely that the tapping screw will come off accidentally during conveyance or the like of the rotary connector. Thus, the locked state between both housings 1 and 2 can be maintained positively.

Moreover, as a member for restricting the free rotation of the first housing 1, the two engaging projections 10a and 10b are integrally formed in the circumferential direction of the second housing 2 at a predetermined spacing, so that it is possible to effect locking between both housings 1 and 2 while restricting the rotation of the first housing 1 within a predetermined angular range. Therefore, by turning the first housing 1 within the predetermined angular range, it is possible to correct a deviation in position between the rotary connector and the steering system at the time of mounting the former to the latter, thus permitting this mounting work to be carried out in a simple manner.

Further, since the holding member 6 is integral with the first housing 1 through the thin-walled portion 1a, the holding member can be cut easily without using a jig such as a screwdriver. Consequently, the locked state of both housings 1 and 2 can be released by such a simple operation as removing the holding member 6 from the first housing 1.

The present invention is not limited to the above embodiment, but various modifications may be made. For example, although in the above embodiment the first housing 1 is used as a movable member, the second housing 2 is used as a fixed member, the first housing 1 may be used as a fixed member and the second housing may be used as a movable member.

Although in the above embodiment the tapping screw 7 is used as the rotation restricting member, in place of the tapping screw, a commonly-used screw may be threadedly engaged with a threaded hole formed in the support portion 6b of the holding member 6, or a stepped pin capable of insertion only in one direction may be press-fitted in the hole 6c of the holding member 6.

Further, although in the above embodiment the thin-walled portion 1a is used as an allowance for cutting, a large number of small holes may be formed between the base portion of the holding member 6 and the first housing 1 and those small holes may be used an allowance for cutting.

According to the present invention, as set forth hereinabove, not only the free rotation between both housings can be locked by such a simple operation as fixing the rotation restricting member to the holding member integral with the first housing, but also the locked state between both housings can be released by such a simple operation as removing the holding member from the first housing at the allowance for cutting. Thus, it is possible to provide a rotary connector superior in working efficiency.

What is claimed is:

1. A rotary connector comprising:

a first housing and a second housing which are interconnected rotatably;

a flexible cable accommodated and wound between said first and second housings;

a holding member formed integrally with said first housing through a weakened portion;

a tapping screw connected to said holding member; and an engaging projection formed integrally with said second housing, wherein a free rotation between said first and second housings is prevented by abutment of a front end of said tapping screw with said engaging projection, and a locked state between said first and second housings is released upon removal of said holding member from said first housing at said weakened portion.

2. A rotary connector according to claim 1, wherein said weakened portion is constituted by a thin-walled portion.

3. A rotary connector according to claim 1, wherein said engaging projection is provided in a pair circumferentially at a predetermined spacing.

4. A rotary connector comprising:

a first housing and a second housing which are interconnected rotatably;

a flexible cable accommodated and wound between said first and second housings;

a holding member formed integrally with said first housing through a weakened portion;

a screw connected to said holding member; and an engaging projection formed integrally with said second housing, wherein a free rotation between said first and second housings is prevented by abutment of a front end of said screw with said engaging projection, and a locked state between said first and second housings is released upon removal of said holding member from said first housing at said weakened portion.

5. A rotary connector according to claim 4, wherein said weakened portion is constituted by a thin-walled portion.

6. A rotary connector according to claim 4, wherein said engaging projection is provided in a pair circumferentially at a predetermined spacing.

7. A rotary connector comprising:

a first housing;

a second housing interconnected rotatably with said first housing, said second housing including an integral engaging projection;

a flexible cable accommodated and wound between said first and second housings;

a holding member formed integrally with said first housing through a weakened portion; and a fastener inserted through said holding member and having a front end positioned within said engaging projection; and wherein a free rotation between said first and second housings is prevented by abutment of said front end of said fastener with said engaging projection, and a locked state between said first and second housings is released upon separation of said holding member from said first housing at said weakened portion.

8. A rotary connector according to claim 7, wherein said holding member includes a wall having a first thickness, and said weakened portion is constituted by a thin-walled portion formed in said wall.

9. A rotary connector according to claim 7, wherein said engaging projection is provided in a pair circumferentially at a predetermined spacing.

* * * * *